June 11, 1968     R. L. McCOMBIE     3,388,034
LAMINATED SAFETY GLASS
Filed Jan. 13, 1965
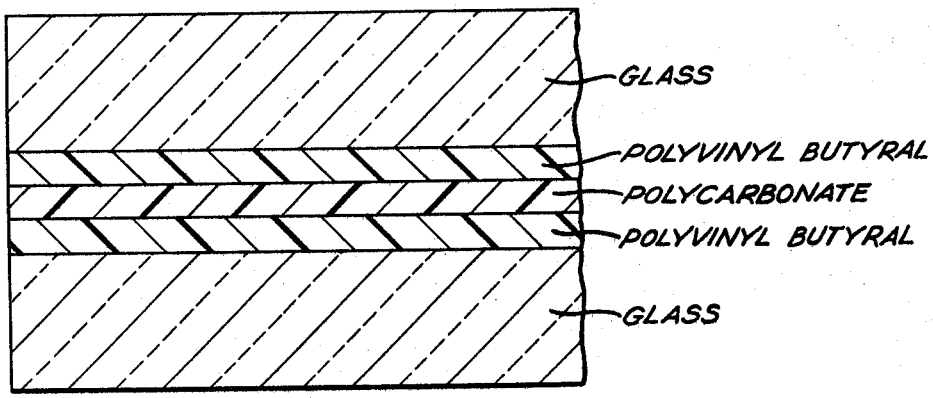
INVENTOR.
ROBERT L. McCOMBIE
BY
ATTORNEYS.

United States Patent Office 3,388,034
Patented June 11, 1968

3,388,034
LAMINATED SAFETY GLASS
Robert L. McCombie, Pittsburgh, Pa., assignor to Mobay Chemical Company, Pittsburgh, Pa., a corporation of Delaware
Filed Jan. 13, 1965, Ser. No. 425,297
6 Claims. (Cl. 161—183)

ABSTRACT OF THE DISCLOSURE

Laminated articles including safety glass where a sheet of polyaryl carbonate is bonded to a sheet of polyvinyl acetal in face to face contact. The initial laminate may be again sandwiched between layers of glass.

---

This invention relates to a laminated article and more particularly to the lamination of polycarbonate and glass.

It has been proposed heretofore to prepare safety glass by laminating two sheets of glass with polyvinyl butyral as an interlayer. Since about 1936, polyvinyl butyral made especially for use as a safety glass interlayer has replaced all of the earlier adhesives because it has high clarity, good low temperature sensitivity, high impact strength, good weather stability and good bonding to glass without the necessity for intermediate adhesives. It is also known to sandwich polyester sheets between the layers of polyvinyl butyral and glass in order to provide a strong plastic interlayer. The polyester sheet, however, remains flexible and could not be used as a structural support for example to eliminate the necessity for cornerposts in an automobile. It would be desirable to construct a front and rear window for an automobile which had such strength that it would support the roof without the necessity for cornerposts. Polyarylcarbonates possess sufficient strength and clarity in the correct thickness to be used for such a purpose. But the polycarbonate has insufficient scratch resistance so that when subjected to abrasive force such as windshield wipers it would become scratched and no longer transparent.

It is not practical to make safety glass by bonding polycarbonate directly to glass because polycarbonate and glass have different co-efficients of linear thermal expansion. A safety glass made by bonding polycarbonate directly to glass will crack and craze on cooling from the temperature necessary to bond the two together due to different thermal expansion co-efficients.

It is, therefore, an object of this invention to provide a laminated article based on a polyarylcarbonate and glass as well as precursors laminates which are free of the foregoing disadvantages. Another object of this invention is to provide a glass which has high load bearing properties. Still another object of this invention is to provide a laminated article which is transparent and resistant to breakage. Still another object of this invention is to provide a laminated article of polycarbonate and glass which has good strength properties over a wide temperature range.

These and other objects of the invention will become apparent from the following description and the accompanying drawing.

The foregoing objects and others are accomplished in accordance with this invention, generally speaking, by providing a laminated article comprising a polyarylcarbonate and a polyvinyl acetal. Thus, laminates comprising a polyarylcarbonate bonded to glass or other pellucid sheet-like material with a polyvinyl acetal and precursor laminates adapted to prepare such a laminated article are provided. Therefore, this invention contemplates as a preferred embodiment a laminated article of polyarylcarbonate, polyvinyl acetal and glass. The laminated article of the present invention is preferably made up of five sheets; two of glass, two of polyvinyl acetal and one of polyarylcarbonate. The polyarylcarbonate forms the center layer which is sandwiched between two sheets of polyvinyl acetal which is in turn sandwiched between two sheets of glass. Still further the invention contemplates a prelaminate of part of the sheets which form the final laminate. For example, it is possible to sandwich a sheet of polyarylcarbonate between two sheets of polyvinyl acetal in accordance with the invention by lightly or even firmly pressing them together. This three part prelaminate which is in and of itself new and useful may then be used either immediately or at a much later time as an interlayer for the glass of glass-like sheets to prepare the multiple laminate. The preliminary sandwich in particular has the advantage of being prepared at one location by specialists in the thermoplastics field for use by laminators subsequently at another location. In addition to the foregoing economic and practical desirability for making a prelaminate, there is an unexpected technical advantage also. The prelaminate is much easier to adhere to glass because the polyarylcarbonate cannot take up moisture after being sandwiched between the sheets of polyvinyl acetal. The process steps desirable for adhering polyvinyl acetals to polyarylcarbonates are not always satisfactory for adhering polyvinyl acetals to glass. By making a prelaminate one overcomes these difficulties.

The polyvinyl acetal resins which are employed in the present invention may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester in the presence of a solvent for the product and precipitating the resin product with water. Alternate methods might include carrying out the reaction in the presence of a non-solvent dispersing medium such as water or a non-solvent mixture of water and solvent, e.g. a water ethanol mixture. More detailed methods for preparing such resins are set forth in Morrison et al. U.S. Patent No. Re. 20,430, dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde, and mixtures thereof. Particularly preferred are polyvinyl acetal resins made from butyraldehyde. The preferred molecular weight range is 150,000 to 250,000.

In general, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyraldehyde acetal, the polyvinyl acetal resin will preferably contain, on a weight basis, from 16 to 25% hydroxyl groups, calculated as polyvinyl alcohol and from 0 to 10% acetate groups, calculated as polyvinyl acetate, the balance being substantially butyraldehyde acetal.

The laminated article of this invention takes advantage of the unusual mechanical properties of glass. Thus, in accordance with this invention, the function of the polycarbonate is not purely structural. The function of the polycarbonate is to make the glass function as a structure bearing member even when shattered. Thus, the laminated article of this invention retains a large percentage of its load bearing properties even after the glass has been shattered so that a car body can be constructed where the front and rear windows serve as the sole supporting members for the roof. Such a car body dropped on its top will shatter the glass, but the load bearing properties of the laminated glass are retained sufficiently so that the roof is supported by this main load bearing column. Further illustration of utility include airplane windshields, loadbearing walls of buildings, partitions and the like.

The polycarbonate may be any suitable film of polycarbonate such as that disclosed in U.S. Patents 3,028,365 and 3,117,019 and is preferably prepared by reacting di-(monohydroxyaryl)-alkanes with derivatives of the carbonic acid such as phosgene and bischloro-carbonic acid esters of di-(monohydroxyaryl)-alkanes.

The aryl residues of the di-(monohydroxyaryl)-alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di-(monohydroxyaryl)-alkanes linking the two benzene rings can be an open chain or a cycloaliphatic ring and may be substituted, if desired, for example, by an aryl residue.

Suitable di-(monohydroxyaryl)-alkanes are for example (4,4'-dihydroxy-diphenyl)-methane, 2,2-(4,4'-dihydroxy - diphenyl) - propane, 1,1-(4,4' - dihydroxy-diphenyl)-cyclohexane, 1,1-(4,4' - dihydroxy - 3,3' - dimethyl-diphenyl)-cyclohexane, 1,1-(2,2'-dihydroxy-4,4'-dimethyl-diphenyl)-butane, (boiling point: 185–188° C. under 0.5 mm. mercury gauge), 2,2-(2,2'-dihydroxy-4,4'-di-tert.-butyl-diphenyl)-propane or 1,1'-(4,4'-dihydroxy-diphenyl)-1-phenyl ethane, furthermore methane derivatives which carry besides two hydroxy-aryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149–150° C.), 3,3-(4,4'-dihydroxy-diphenyl)-pentane, 2,2-(4,4'-dihydroxy - diphenyl) - hexane, 3,3 - (4,4' - dihydroxy-diphenyl) - hexane, 2,2 - (4,4' - dihydroxy-diphenyl)-4-methyl-pentane (melting point 151–152° C.), 2,2-(4,4'-dihydroxy-diphenyl)-heptane, (boiling point 198–200° C. under 0.3 mm. mercury gauge), 4,4-(4,4'-dihydroxy-diphenyl)-heptane (melting point 148–149° C.), or 2,2-(4,4'-dihydroxy-diphenyl)-tridecane. Suitable di-(monohydroxyaryl)-alkanes the two aryl residues of which are different are for example 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxy aryl)-alkanes are the aryl residues of which carry halogen atoms for instance 2,2-(3,5,3',5'-tetra-chloro-4,4'-dihydroxy-diphenyl)-propane, 2,2-(3,5,3',5'-tetrabromo-4,4'-dihydroxy - diphenyl) - propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes the alkyl residue of which linking the two benzene rings is substituted by an aryl residue are for instance (4,4'-dihydroxy-diphenyl)-phenyl-methane and 1,1-(4,4'-dihydroxy-diphenyl)-1-phenyl-ethane.

In order to obtain special properties, mixtures of various di-(monohydroxy aryl)-alkanes can also be used, thus mixed polycarbonates are obtained.

The conversion of the aforesaid di-(monohydroxyaryl)-alkanes into high molecular polycarbonates by reacting with the mentioned derivatives of the carbonic acid may be carried out as known in the art. For instance, the di-(monohydroxyaryl)-alkanes can be re-esterified with carbonic acid diesters, e.g., dimethyl-, diethyl-, dipropyl-, dibutyl-, diamyl-, dioctyl-, dicyclohexyl-, diphenyl- and di-o,p-tolyl carbonate at elevated temperatures from about 50 to about 320° C. and especially from about 120 to about 280° C.

The polycarbonates can also be produced by introducing phosgene into solutions of di-(monohydroxyaryl)-alkanes in organic bases such as dimethylaniline, diethylaniline, trimethylamine and pyridine or into solutions of di-(monohydroxyaryl)-alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate, and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di-(monohydroxyaryl)-alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of the phosgene.

Finally, it is also possible to react the di-(monohydroxyaryl)-alkanes with about equimolecular amounts of bis-chloro carbonic acid esters of di-(monohydroxyaryl)-alkanes under corresponding conditions.

In the production of polycarbonates according to the various processes it is advantageous to employ small amounts of reducing agents, for example sodium-or potassium-sulphide, -sulphite and dithionite or free phenol and p-tert.-butylphenol.

By adding monofunctional compounds which are capable of reacting with phosgene or with the end groups of the polycarbonates consisting of the chlorocarbonic acid ester group and which terminate the chains, such as the phenols for instance the phenol, the tert.-butyl phenol, the cyclohexylphenol, and 2,2-(4-hydroxyphenol-4'-methoxyphenyl)-propane, further aniline and methylaniline, it is possible to regulate the molecular weight of the polycarbonates in wide limits.

The reaction of the di-(monohydroxyaryl)-alkanes with phosgene or of the chlorocarbonic esters of the di-(monohydroxyaryl)-alkanes may be carried out at room temperature or at lower or elevated temperatures, that is to say at temperatures from the freezing point to the boiling point of the mixture. (Column 1, line 31 to column 3, line 1 of 3,028,365.) The polycarbonate film preferably has a thickness of from about 5 to 250 mils and most preferably from about 60 to about 100 mils. In some case it may be desirable to use copolymers of various dihydroxyaryl propanes in order to achieve special properties.

Other pellucid materials are disclosed in U.S. Patent 3,069,301 at column 1, lines 62–68 which are rigid and resistant to scratching and essentially non-hydroscopic.

In preparing the final preferred structural glass of this invention, the sheets are assembled one on top of the other with the polycarbonate in the center sandwiched by polyvinyl butyral sheets and glass sheets respectively and then the assembled laminate is subjected to heat and pressure sufficient to cause permanent adherence of one layer to the other. It is preferred to pre-dry the polycarbonate sheets prior to assembling the laminate. After assembly of the laminate, as mentioned above, it is preferred to warm the assembly. Desirably, the warm assembled laminate is passed through de-airing rolls to lightly adhere the layers together and expel the air. This can subsequently be passed through tacking rolls. The warm lightly adhered laminate is then preferably passed into an oil autoclave or other high pressure equipment and heated to a temperature of about 250 to 350° F. at a pressure of about 180 to about 250 p.s.i. for about 10 to 15 minutes. The oil is preferably allowed to reach temperature before any significant pressure is applied, but it is understood that the pressure is sufficient to hold the laminate together during the initial heat-up period in the autoclave. The assembly is allowed to cool to about 150° F. or lower while still under pressure and then the pressure is removed and the complete assembly is washed with water and detergent to remove the oil. Laminates prepared in this manner have exceptional load bearing properties and are suitable for structural or engineering purposes. It is preferred to use a pressure of about 200 p.s.i. and it is preferred to employ temperatures of about 300° F. in the preparation of the structural glass laminates.

The structural laminated glass of the invention is useful in many areas where it was impossible to use glass heretofore, for example, for the preparation of windshields for automobiles which eliminate the need for cornerposts by forming not only the windshield but also the supporting member for the roof of the automobile.

The invention is further illustrated by the following examples in which parts are by weight unless otherwise specified. Unless otherwise indicated, the polyvinyl acetal resin used throughout these examples is polyvinyl butyral resin having a moisture content of 2.0%, and contains approximately 21% hydroxyl groups calculated as polyvinyl alcohol and approximately 2% acetate groups calculated as polyvinyl acetate, the balance being substantially butyral, average molecular weight is about 200,000. About 100 parts of polyvinyl butyral are used with about 40 parts of triethylene glycol di-(2-ethyl butyrate) as a plasticizer. A cake is prepared by mixing together the polyvinyl butyral and the plasticizer to prepare a plasticized cake. The cake is skived to prepare a sheet of the stated thickness. The thickness may vary over a wide range, but is preferably 10 to 45 mils.

EXAMPLE 1

A sheet of plate glass about 12 x 12 inches having a thickness of about 125 mils is covered with a sheet of polyvinyl butyral about 12 x 12 inches and having a thickness of about 15 mils. A sheet of polyarylcarbonate having a thickness of about 90 mils which measures about 12 x 12 inches and which is prepared according to U.S. Patent 3,117,019 from phosgene and 2,2-bis-(4-hydroxyphenyl)propane having a relative viscosity of about 1.35 measured in methylene chloride at 25° C. is placed on top of the polyvinyl butyral. The sheet of polyarylcarbonate is pre-dried in an oven at 250° F. for four hours. Then another sheet of polyvinyl butyral and another sheet of glass identical to the first two sheets are placed on the polycarbonate in the order named. The assembly is warmed to about 100° F. and then passed through de-airing rolls to lightly adhere the layers and expel air. It is then heated to about 160° F. and passed through tacking rolls. The assembly is then placed in an oil autoclave and heated to a temperature of about 275° F. and a pressure of about 200 p.s.i. for about 15 minutes. The temperature is reduced to about 150° F. and then the pressure is released. The glass is washed with detergent and water to remove the oil. A laminate so constructed discolors somewhat due to crazing of the polycarbonate, but when impacted with sufficient force to crack the glass does not delaminate and therefore retains its load supporting capacity.

EXAMPLE 2

The foregoing example is repeated except that the assembly is placed in the oil autoclave and first heated to about 300° F. over a period of about 30 minutes at a pressure barely sufficient to hold the first assembly together. A pressure of 200 lbs./in.² is then applied for about 10 minutes. The temperature is reduced to about 150° F. and the pressure is released.

EXAMPLE 3

Example 1 is repeated except that the plate glass is replaced with chemically tempered glass having a thickness of about 60 mils and sold under the trade name Chemcor by Corning Glass Works.

EXAMPLE 4

Example 1 is repeated except that the polyvinyl butyral is replaced with polyvinyl formal. This is an acetal resin having a moisture content of about 2.0% and contains approximately 8% hydroxyl groups calculated as polyvinyl alcohol and approximately 11% acetate groups calculated as polyvinyl acetate and the balance substantially formaldehyde acetal. The molecular weight is about 200,000.

EXAMPLE 5

A pre-laminate is prepared by pressing a pre-dried sheet of the polyarylcarbonate of Example 1 between two sheets of polyvinyl butyral having the thickness specified in Example 1 by warming the pre-laminate under light adhesion and passing it through rubber pinch rollers. The pre-laminate is then sandwiched between sheets of glass in accordance with the procedure of Example 1.

It is to be understood that the foregoing examples are for the purpose of illustration and that any other suitable glass, polyvinyl acetal, polyarylcarbonate or the like could be used provided that the teachings of this disclosure are followed.

Although the invention has been described in considerable detail in the foregoing, it is to be understood that such detail is solely for the purpose of illustration and that many variations including laminations where more than one layer of polyarylcarbonate, more than one layer of polyvinyl acetal, more than one layer of glass, etc., other means of forming a stable laminate such as bagging the assembly, evacuating and placing the bagged assembly in an autoclave, can be made by those skilled in the art without departing from the spirit and scope of the invention except as set forth in the claims.

What is claimed is:

1. A laminated article comprising a sheet of polyarylcarbonate bonded to a sheet of polyvinyl acetal in face to face contact.

2. The laminated article of claim 1 wherein said polyvinyl acetal is a polyvinyl butyral.

3. A laminated article comprising a sheet of polyarylcarbonate bonded to a transparent panel with a polyvinyl acetal interlayer.

4. The laminated article of claim 3 wherein said article comprises five layers composed of a center layer of polyarylcarbonate sandwiched between layers of polyvinyl butyral, said sandwich being again sandwiched between layers of glass.

5. A pre-laminate comprising at least one sheet of polyarylcarbonate sandwiched between at least two sheets of polyvinyl acetal.

6. A five layer laminated glas article having high load bearing properties and a thickness of from about 140 to about 380 mils which comprises a sheet of polyarylcarbonate having a thickness of from about 60 to about 100 mils, two sheets of polyvinyl butyral having a thickness of from about 10 to about 45 mils and two sheets of glass having a thickness of from about 60 to about 125 mils, one flat surface of each sheet of polyvinyl butyral being adhesively bonded to one of the opposite surfaces of said polycarbonate sheet and the other flat surface of each of said polyvinyl butyral sheets being adhesively bonded to a surface of each of said glass sheets.

References Cited

UNITED STATES PATENTS

| | | | |
|---|---|---|---|
| 3,341,391 | 9/1967 | Hamilton et al. | 161—183 X |
| 2,425,568 | 8/1947 | Ryan et al. | 161—199 |
| 2,534,102 | 12/1950 | Buckley et al. | 161—199 |
| 2,787,568 | 4/1957 | Koblitz | 161—183 |

OTHER REFERENCES

G. E. Lexan: "Polycarbonate Resins," Tech. Report C.D.C.-502, January 1962, pages 7 and 8.

EARL M. BERGERT, *Primary Examiner.*

HAROLD ANSHER, *Examiner.*